United States Patent [19]

Kanbayashi et al.

[11] Patent Number: 5,635,326

[45] Date of Patent: Jun. 3, 1997

[54] ELECTROSTATIC IMAGE-DEVELOPING TONER, FINE POWDERY TITANIUM OXIDE, AND HYDROPHOBIC FINE POWDERY TITANIUM OXIDE

[75] Inventors: Makoto Kanbayashi; Tsuyoshi Takiguchi, both of Kawasaki; Wakashi Iida, Kurume, all of Japan

[73] Assignee: Canon Kabushiki Kaisha, Tokyo, Japan

[21] Appl. No.: 385,918

[22] Filed: Feb. 9, 1995

[30] Foreign Application Priority Data

Feb. 10, 1994 [JP] Japan .................................. 6-016373
Feb. 10, 1994 [JP] Japan .................................. 6-016374

[51] Int. Cl.$^6$ .................................................. G03G 9/097
[52] U.S. Cl. .................................... 430/110; 428/405
[58] Field of Search .......................... 430/110; 428/403, 428/405

[56] References Cited

U.S. PATENT DOCUMENTS

| | | |
|---|---|---|
| 2,221,776 | 11/1940 | Carlson . |
| 2,297,691 | 10/1942 | Carlson . |
| 2,618,552 | 11/1952 | Wise . |
| 2,874,063 | 2/1959 | Greig . |
| 3,909,258 | 9/1975 | Kotz . |
| 4,666,813 | 5/1987 | Sakashita ........................ 430/110 |
| 5,192,637 | 3/1993 | Saito et al. ...................... 430/109 |
| 5,250,382 | 10/1993 | Shimojo et al. ................. 430/109 |
| 5,320,925 | 6/1994 | Imai et al. ....................... 430/110 |

FOREIGN PATENT DOCUMENTS

| | | |
|---|---|---|
| 413824 | 1/1991 | European Pat. Off. . |
| 494692 | 7/1992 | European Pat. Off. . |
| 523654 | 1/1993 | European Pat. Off. . |
| 42-23910 | 11/1967 | Japan . |
| 43-24748 | 10/1968 | Japan . |
| 48-47345 | 7/1973 | Japan . |
| 52-19535 | 2/1977 | Japan . |
| 52-32256 | 8/1977 | Japan . |
| 56-64352 | 6/1981 | Japan . |
| 56-128956 | 10/1981 | Japan . |
| 59-52255 | 3/1984 | Japan . |
| 61-160760 | 7/1986 | Japan . |
| 4-40467 | 2/1992 | Japan . |
| 4-337739 | 11/1992 | Japan . |
| 4-348354 | 12/1992 | Japan . |
| 5-72797 | 3/1993 | Japan . |

OTHER PUBLICATIONS

Patent Abstracts of Japan, vol. 10, No. 36 (C–328), Feb. 1996 of JP–60–186418.
Patent Abstracts of Japan, vol. 12, No. 297 (C–519), Aug. 1988 of JP–63–066273.
Patent Abstracts of Japan, vol. 9, No. 104 (C–279), May 1985 of JP–59–232219.
Patent Abstracts of Japan, vol. 18, No. 75 (C–1163), Feb. 1994 of JP–52–086752.
Suzuki, "Tone Reproduction Technology of Electrophotography", J. of Electrophotography Soc., vol. 25, No. 1, pp. 52–58 (1986).

*Primary Examiner*—Roland Martin
*Attorney, Agent, or Firm*—Fitzpatrick, Cella, Harper & Scinto

[57] ABSTRACT

A toner for developing an electrostatic image, which comprises a colorant-containing particulate resin and a treated fine powdery material prepared by treating fine powdery titanium oxide with a silane-type organic compound, where the fine powdery titanium oxide is mainly composed of a $TiO_2$ component and a $Ti(OR)_m(OH)_n$ component wherein R is a hydrocarbon group, m and n are respectively an integer of from 0 to 4, and m+n is 4.

43 Claims, 3 Drawing Sheets

ELECTROSTATIC IMAGE-DEVELOPING TONER, FINE POWDERY TITANIUM OXIDE, AND HYDROPHOBIC FINE POWDERY TITANIUM OXIDE

BACKGROUND OF THE INVENTION

1. Field of the Invention

The present invention relates to a toner for developing an electrostatic image in dry process to form images in electrophotography, electrostatic recording, electrostatic printing, and the like. The present invention also relates to a fine powdery titanium oxide, particularly to hydrophobic fine powdery titanium oxide suitable as an external additive to the toner.

2. Related Background Art

Methods for developing an electrostatic image are well known in which an electrostatic image is formed on a photoconductive surface by electrostatic means and subsequently the image is developed with a toner. Various methods have been disclosed, for example, in U.S. Pat. No. 2,297,691, JP-B-42-23910, and JP-B-4324748 ("JP-B" herein means "examined Japanese patent publication). In these methods, generally, an electrostatic latent image is formed on a photosensitive member employing a photoconductive substance and thereon a toner image is formed corresponding to the electrostatic image with the toner adhering to the latent image. Then, the toner image is transferred onto a surface of a desired image supporting medium (recording medium) such as a paper sheet, and the transferred image is fixed by heating, pressing, heat-pressing, or solvent-vapor exposure to obtain a copy. In the method involving a step of transferring the toner image, a cleaning step is usually provided to remove remaining toner as required.

The known developing methods to visualize an electrostatic image with a toner include powder cloud development described in U.S. Pat. No. 2,221,776, cascade development described in U.S. Pat. No. 2,618,552, magnetic brush development described in U.S. Pat. No. 2,874,063, and electro-conductive magnetic toner development described in U.S. Pat. No. 3,909,258.

The toner used in such development methods is generally prepared by mixing a thermoplastic resin with a colorant for dispersion, and pulverizing it. Polystyrene resin is generally used as the thermoplastic resin. Polyester resin, epoxy resin, acrylic resin, urethane resin, or the like is also useful therefor. As the colorant, carbon black is widely used. In a magnetic toner, iron oxide type black magnetic powder is widely used. When a two-component developer is used, the toner is usually mixed with a particulate carrier such as glass beads, iron powder, magnetic ferrite powder, or resin-coated particles thereof.

The toner image on the final image bearing member like a paper sheet is fixed thereon by heating and/or pressing. Thermal fixation is frequently employed therefor.

In recent years, copying machines and printers have been rapidly developing from mono-color image to full-color image, and two-color copying machines and full-color copying machines are now practically used. For example, studies on color reproduction, or tone reproduction are reported in "Denshi Shashin Gakkaishi (Journal of Electrophotography Society)": Vol. 22, No.1 (1983), and Vol. 25, No.1, page 52 (1986).

Further improvement of the present full-color electrophotographic image formation method is required, since the people are accustomed to artificial color images like television images, color photographs and color prints more beautiful than actual objects and not compared directly with the actual objects.

In full-color electrophotography, all colors of an image are generally reproduced with three kinds of primary color toners, that is, yellow, magenta, and cyan. In this method, an electrostatic latent image is formed on a photoconductive layer using light from the original passing through a color separation filter which transmits only the complementary color of a toner color, and then the image is developed with the toner and transferred onto a recording member. This process is repeated for each color, and the toner images are superposed on one and the same recording member with registration, and the superposed images are fixed in one step to obtain a final full-color image.

When a two-component developer composed of a toner and a carrier is used, the toner particles are electrostatically charged by friction with the carrier particles to a required level in the desired polarity, and the electrostatic image is developed using electrostatic attraction. Therefore, the triboelectrification properties of the toner mainly determined in relation to the carrier are important for obtaining a excellent visible image.

Accordingly, to obtain satisfying triboelectrification properties, many studies have been made on carrier core materials, carrier core-coating materials, optimum coating amount, toner charge-controlling agents, fluidity-improving agents, improvement of the toner binder, and so forth.

For example, an electrification aid like an electrifiable fine particulate material is added to the toner, JP-B-52-32256 and JP-A-56-64352 ("JP-A" herein means "Unexamined Laid-Open Japanese Patent Application") propose to add to the developer a fine powdery resin having the polarity opposite to the toner; and JP-A-61-160760 discloses addition of a fluorine-containing compound to the developer to obtain stable triboelectrification properties of the toner.

The above electrification aid is generally added by adhesion of the electrification aid to the toner particle surface through electrostatic force, Van der Waals force, etc. where a stirring or mixing machine is used for it. In such a method, uniform adhesion of the electrification aid does not readily occur on the toner particle surface, and the additive not adhering to the toner form aggregates. This tendency is more remarkable with the larger electric resistivity and the smaller particle size of the electrification aid, which adversely affects the toner performance. For example, unstable triboelectrification, fluctuation of image density, and fogging tend to occur. There is also a problem that the content of the electrification aid changes so that the initial image quality cannot be maintained during continuous copying.

In another method of addition, the electrification aid is added in advance during production of the toner along with a binding resin and a colorant. However, uniform dispersion of the electrification aid is difficult. Further, only the electrification aid on or near the surface actually contributes to the electrification, and the electrification aid or the charge-controlling agent in the interior of the toner particles do not contribute to the electrification properties. Therefore, the amount of the electrification aid to be added or the amount thereof on the toner surface is difficult to control, and the triboelectrification is liable to be unstable even with the toner prepared by such a method.

In recent years, for image output of copying machines and printers, finer and higher quality is required. To improve the image quality, it has been attempted to make the toner particle diameter smaller. However, the finer particle diameter of the toner results in increase of the surface area per unit weight, thus increasing the amount of electrification, which tends to cause low image density and deterioration of durability. Additionally, the larger electric charge of the toner increases the adhesion between toner particles, lowering fluidity of the toner and causing problems in stability of toner supply and impartment of triboelectricity to the supplied toner.

A color toner, which does not contain electroconductive substance like carbon black or magnetic material to leak electric charge, tends to be charged at a higher level. This tendency is remarkable when a polyester binder is employed as the binder for the toner.

For color toners, are strongly required properties as set forth in below.

(1) The fixed toner particles should be almost completely fused so that the individual toner particles are not discriminable to reproduce the color without irregular reflection of light;

(2) The color toner should be transparent not to intercept the underlying color of another color toner layer; and (3) Each color toner should have well-balanced hue and spectral reflection characteristics, and sufficient color saturation.

From such viewpoints, various binder resins are under investigation to satisfy the above requirements. At the moment, polyester resins are widely used as the binder resin for the color toner. The toner comprising a polyester resin is generally affected by temperature and humidity, electric charge is excess at low humidity, and insufficient at high humidity. Therefore, color toners are desired which have stable charge under various environmental conditions.

In JP-A-48-47345, use of powdery metal oxide is disclosed as an abrasive. Metal oxides like titanium oxide are disclosed as the fluidizing agent in JP-A-52-19535 and JP-A-56-128956. Further, a surface treated amorphous titanium oxide powder is disclosed in JP-A-4-337739, JP-A-4-348354, JP-A-4-40467, and JP-A-5-72797 for the purpose of imparting fluidity to toner particles, stabilizing electric charge and preventing the filming of the toner.

Addition of hydrophobic titanium oxide treated with alkyltrialkoxysilane to the toner is proposed in JP-A-59-52255. The added hydrophobic titanium oxide improves electrophotographic properties of the toner. However, the hydrophobicity may be still insufficient for that purpose since the surface activity of titanium oxide is inherently low in comparison with silica. Further increasing the amount of the treating agent or the treatment period to raise the hydrophobicity is liable to cause agglomeration of titanium oxide particles during the treatment or to cause non-uniformity of the hydrophobicity.

Fine powdery materials are used in various fields and their surfaces are usually treated to meet the requirements in the particular field.

As stated above, in the electrophotographic application field, fine powdery silica, fine powdery titanium oxide, or the like is used as the external additive to the toner for electrophotographic development, and the powdery material treated for hydrophobicity is also used to stabilize the electrophotographic properties of the toner in various environmental conditions.

Known titanium oxide includes those formed by neutralizing aqueous titanium sulfate solution and firing the formed precipitate; those formed by decomposing and oxidizing titanium chloride at a high temperature; and those formed by hydrolyzing or pyrolyzing titanium alkoxide. These titanium oxide are anatase, rutile, or amorphous in crystal structure. The titanium oxide is treated with a hydrophobicity-imparting agent such as the silane-coupling agent to form hydrophobic titanium oxide. Known titanium oxides, however, are not sufficiently reactive to the hydrophobicity-imparting agent, and therefore development of more reactive fine powdery titanium has been desired.

SUMMARY OF THE INVENTION

The present invention intends to provide a toner for developing electrostatic latent images, not having above mentioned problems.

The present invention intends to provide an electrostatic image-developing toner which gives sharp and fogless images and is excellent in durability.

The present invention intends also to provide an electrostatic image-developing toner which is excellent in fluidity, development fidelity and transferability.

The present invention further intends to provide an electrostatic image-developing toner which is not affected by environmental conditions such as temperature and humidity and has stable triboelectrification properties.

The present invention still further intends to provide an electrostatic image-developing toner which is readily cleaned off and causes less filming and less contamination of the photosensitive member.

The present invention still further intends to provide an electrostatic image-developing toner which is readily fixed and gives sufficiently transparent image for OHP.

The present invention still further intends to provide a fine powdery material of titanium oxide which is reactive to a hydrophobicity-imparting agent.

The present invention still further intends to provide a fine powdery material of amorphous titanium oxide which is less crystalline.

The present invention still further intends to provide a hydrophobic fine powdery material of titanium oxide which is not affected by environmental conditions and is useful as a fluidity-improving agent.

The present invention still further intends to provide a hydrophobic fine powdery material of titanium oxide which is useful as an external additive to the electrophotographic toner.

The present invention provides an electrostatic image-developing toner which comprises a colorant-containing particulate resin and a treated fine powdery material prepared by treating fine powdery titanium oxide with an organic silane compound, the fine powdery titanium oxide being composed mainly of a $TiO_2$ component and a $Ti(OR)_m(OH)_n$ component, where R is a hydrocarbon group, m and n are respectively an integer of from 0 to 4, and m+n is 4.

The present invention provides a fine powdery material which comprises a composition composed mainly of a $TiO_2$ component and a $Ti(OR)_m(OH)_n$, where R is a hydrocarbon group, m and n are respectively an integer of from 0 to 4, and m+n is 4.

The present invention provides a hydrophobic fine powdery material which comprises a hydrophobic fine powdery titanium oxide prepared by treating a fine powdery titanium oxide with an organic silane compound, the fine powdery titanium oxide being composed mainly of a $TiO_2$ component and a $Ti(OR)_m(OH)_n$, where R is a hydrocarbon group, m and n are respectively an integer of from 0 to 4, and m+n is 4.

DESCRIPTION OF THE PREFERRED EMBODIMENTS

After comprehensive investigation on toner properties such as fluidity, electrification stability, transfer property, and cleaning property of the electrostatic image-developing toner, the inventors of the present invention found that the fine powdery material of the above composition is particularly effective as an external additive to improve fluidity and electrification stability of the toner.

Such improvements have not been achieved by using a conventional inorganic oxide like titanium oxide as the fluidity-improving agent. This is because the conventional titanium oxide production process requires sintering, hydrolysis or thermal decomposition at a high temperature, which tends to give coarse particles and the resulting titanium oxide tends to be anatase or rutile in its crystalline structure. To the contrary, the fine powdery titanium oxide mainly composed of $TiO_2$ and $Ti(OR)_m(OH)_n$ (where R is a saturated or unsaturated cyclic or acyclic hydrocarbon group, m and n are respectively an integer of from 0 to 4, and m+n is 4) is prevented from coarsening of the powder particles, with less tendency of aggregation of the primary particles, and imparting satisfactory fluidity to the toner.

Further, the fine powdery material of the present invention contains titanium alkoxide and/or a titanium-hydroxy component, having much more active Ti—OH group on the surface thereof than ordinary rutile, anatase, or amorphous titanium oxide particles. Therefore, the fine powdery material of the present invention exhibits satisfactory dispersibility among the toner particles, adheres strongly to the binder resin when applied on the surface of the toner particles, does not come off from the toner surface with repeated use not to soil the surface of the carrier and the drum. Therefore the initial properties are maintained even after long term of repeated use.

The fine powdery material of the present invention comprises the $TiO_2$ component and the $Ti(OR)_m(OH)_n$ component. Therefore, when a toner containing the fine powdery material is electrified by friction with the carrier, the $Ti(OR)_m(OH)_n$ component in the fine powdery material functions as a kind of leaking points to effectively prevent the excessive electrification, especially at low temperature and low humidity, and to give stable electrification of the toner. In particular, this effect is remarkable when a polyester resin is used as the binder resin.

Furthermore, since the fine powdery material of the present invention has a small primary particle diameter and few secondary aggregated particles, it can be externally added to colorant-containing resin particles uniformly when applied to a color toner for full-color toner image formation, thereby enabling formation of sharp OHP image with high transmittance to visible light. Such effects can not been achieved by a conventional titanium oxide powder.

For example, a yellow toner may be prepared by mixing a yellow colorant-containing particulate resin with the treated fine powdery material; a magenta toner may be prepared by mixing a magenta colorant-containing particulate resin with the treated fine powdery material; a cyan toner may be prepared by mixing a cyan colorant-containing particulate resin with the treated fine powdery material; and a black toner may be prepared by mixing a black colorant-containing particulate resin with the treated fine powdery material.

In treatment of the fine powdery material with an organic silane compound, or the like, a conventional rutile, anatase, or amorphous titanium oxide fine particles cannot be sufficiently treated owing to insufficient amount of the active Ti—OH group, whereas the fine powdery titanium oxide of the present invention can be treated uniformly at the surface without formation of aggregates, owing to smooth reaction between the $Ti(OR)_m(OH)_n$ component and the treating agent, to give a desired level of hydrophobicity, which enables stable electrification of the toner even at high temperature and high humidity.

In the present invention, a fine powdery material mainly composed of $TiO_2$ and $Ti(OR)_m(OH)_n$ is particularly desirable which is prepared by thermal decomposition of a volatile titanium compound like a titanium alkoxide in gas phase at a relatively low temperature of 600° C. or lower, preferably from 200° C. to 400° C. Particularly preferably, the fine powdery material is prepared by vaporizing or atomizing a volatile titanium compound at relatively low temperature of from 200° C. to 400° C., hydrolyzing it in the presence of heated water vapor or thermally decomposing it, and then immediately cooling it as soon as possible to a temperature where the fine particles do not coalesce, preferably 100° C. or lower.

In a manner as described above, the fine powdery material having a fine primary particle size is obtained.

The present invention is described in more detail below.

After comprehensive study on preparation of a fine powdery material with less tendency for coalescence and particle growth, the inventors of the present invention found that, in a composition having $TiO_2$ and $Ti(OR)_m(OH)_n$ as the essential components, crystallization of the titanium oxide is retarded, the particle size becomes smaller, the particle shape becomes more spherical, and the Ti—OH groups at the particle surface increase. Based on the above findings, the present invention has been accomplished. Such effects can not be achieved with a conventional rutile, anatase or amorphous titanium oxide.

In particular, the fine powdery composition of the present invention having as the main components $TiO_2$ and $Ti(OR)_m(OH)_n$ preferably contains $TiO_2$ in an amount of from 85 to 99.5% by weight, and $Ti(OR)_m(OH)_n$ in an amount of from 0.5 to 15% by weight.

If the content of the $TiO_2$ component is less than 85% by weight, that is, a large amount of remaining titanium alkoxide and titanium hydroxy component or a large amount of impurity is present, a sharp particle size distribution of the fine particles can hardly be obtained, and individual particles tend to be non-uniform. A toner containing such a fine powdery material has broad charge distribution when frictionally charged by the carrier, and can hardly achieve uniform development of an image, or high transfer ratio.

On the other hand, if the content of the $TiO_2$ is more than 99.5% by weight, the fine powdery material becomes nearly pure titanium oxide, and tends to have a crystalline structure to give coarse particles and not to give intended fluidity for the toner.

If the content of the $Ti(OR)_m(OH)_n$ is less than 0.5% by weight, the dispersibility of the treated fine powdery material among the colorant-containing particulate resin becomes low. Especially when the treated fine powdery material adheres to the surface of the colorant-containing resin particles (i.e., the treated powdery material is added externally), the particles of the treated powdery material are liable to come off and soil the carrier or the drum. If the carrier particle surface is soiled, the electric charge of the toner decreases remarkably, resulting in scattering of toner and fogging of the image during repeated use as well as difficulty in securing constant image density. Further, when the content of the $Ti(OR)_m(OH)_n$ is less than 0.5% by weight, the fine powdery material tends to have coarse particle size not to achieve desired fluidity of the toner.

On the other hand, if the content of the $Ti(OR)_m(OH)_n$ is more than 15% by weight, which occurs when the hydrolysis or thermal decomposition was insufficient, the composition of the fine powdery material broadly varies. In this case, it is difficult to achieve the stable and sharp distribution of triboelectricity in the toner. Since both the alkoxytitanium component and the hydroxytitanium component adsorb moisture much more strongly than titanium oxide component does, the higher content of the $Ti(OR)_m(OH)_n$ component than 15% by weight tends to cause insufficient electrification at high temperature and high humidity, resulting scattering of the toner and fogging of the image during repeated use. Further, the higher content of the $Ti(OR)_m(OH)_n$ component than 15% by weight tends to deteriorate the property of the fine powdery material to be cleaned, sometimes giving marks on the formed image. This mark due to insufficient cleaning is assumed to be caused by soiling of the surface of the photosensitive member by the fine powdery material (especially the powder containing more $Ti(OR)_m(OH)_n$ component), which reduces the toner release from the photosensitive member.

Accordingly, the fine powdery material or the treated fine powdery material contains preferably the $Ti(OR)_m(OH)_n$ component at a content ranging from 0.5 to 15% by weight, more preferably from 1.0 to 12% by weight, still more preferably from 1.5 to 10% by weight.

The composition ratio of $TiO_2$ to $Ti(OR)_m(OH)_n$ is measured as follows: Firstly, a fine powdery material or a treated fine powdery material is kept standing at 60° C. for 3 days in a vacuum drier to determine the water content. Then carbon content and hydrogen content are determined by means of an elemental analysis apparatus (Model EA-1108, manufactured by Carlo Erba Co.). From the carbon and hydrogen contents, the composition ratio of $TiO_2$ and $Ti(OR)_m(OH)_n$ is calculated.

The compound other than $TiO_2$ is determined by FT-IR analysis to confirm to be $Ti(OR)_m(OH)_n$ (m+n=4). The content of other foreign components is trace and negligible after vacuum drying.

The starting raw material for the fine powdery material of the present invention includes titanium alkoxide such as titanium tetramethoxide, titanium tetraethoxide, titanium tetrapropoxide, titanium tetrabutoxide, and diethoxytitanium oxide. Titanium tetrahalides such as titanium tetrachloride, and titanium tetrabromide, volatile monoalkoxytitanium trihalides, dialkoxytitanium dihalides, trialkoxytitanium monohalides etc. can be also used mixed with a titanium alcoxide compound.

In vaporization or atomization of the titanium alkoxide and/or other volatile titanium compounds, the titanium compound is preferably diluted with a dilution gas to a concentration of 0.1 to 10% by weight. The dilution gas serves also as the carrier gas for introducing the titanium alkoxide and/or another volatile titanium compound to a decomposition furnace. The dilution gas includes inert gases such as argon, helium, and nitrogen; water vapor, and oxygen. In particular, helium gas and/or nitrogen gas is preferably used. If necessary, a dispersion aid, a surface modifying agent, or the like may be additionally employed.

In the present invention, decomposition is carried out after the vaporization or atomization of the titanium alkoxide and/or the volatile titanium compound. Therefore, an oxygen-containing gas should be used for the compound other than the oxygen-containing compounds like an alkoxide.

The decomposition is conducted preferably at a temperature not higher than 600° C., more preferably from 200° C. to 400° C., still more preferably from 250° C. to 350° C. At the decomposition temperature lower than 200° C., the decomposition does not proceed at a sufficient rate, whereas at the decomposition temperature higher than 600° C., it is difficult to obtain a sufficiently fine powdery material.

After the decomposition, the reaction product is preferably cooled rapidly to a temperature in which the formed fine particles do not coalesce each other in the gas phase. By rapid cooling, the coalescence of the formed fine particles is prevented, and the resulting fine particles are collected and recovered satisfactorily in a state of primary particles.

The surface treatment, another feature of the present invention, is explained below. In the present invention, the surface of the fine powdery material containing $Ti(OR)_m(OH)_n$ is preferably treated with an organic silane compound for adjustment of electrification property and improvement of stability of the developer at high temperature and high humidity. In the above gas phase process, preferably the formed fine particles in the gas is immediately mixed with a vaporized or atomized organic silane compound.

The fine powdery composition of the present invention mainly composed of $TiO_2$ and $Ti(OR)_m(OH)_n$ has much higher surface activity owing to a large number of Ti—OH groups reactive to the organic silane compound, and is uniformly treated with a smaller amount of the treating agent to achieve high hydrophobicity. In particular, by the aforementioned gas phase treatment, the fine powdery material can be surface-treated uniformly and sufficiently maintaining the properties of the untreated material, since the steps of filtration, drying, and disintegration of the conventional wet process are not required.

The amount of the organic silane compound for treating the fine powdery composition mainly composed of $TiO_2$ and $Ti(OR)_m(OH)_n$, and the time of the treatment are not specially limited. However, the organic silane compound is used for the surface treatment in such an amount that the treated fine powdery material contains silicon at a content ranging preferably from 1 to 18% by weight, more preferably from 1.5 to 16% by weight, still more preferably from 2.5 to 14% by weight in terms of $SiO_2$. The lower content of Si in terms of $SiO_2$ in the treated fine powdery material of less than 1% by weight is less effective in preventing insufficient electrification, especially density increase at high temperature and high humidity, scattering of the toner, and fogging during repeated use. The higher content of Si in terms of $SiO_2$ of more than 18% by weight tends to give the powdery material a larger primary particle size and a higher tendency of aggregation resulting in many aggregate particles in the treated powdery material. In such a case, the fluidity of the toner is not sufficient, and the falling off of the not-sufficiently reacted treating agent from the surface of the fine powder causes a fogged and coarse toner image, and further to cause an additional problem of carrier contamination.

The gas phase treatment process enables increase of Si content in terms of $SiO_2$ without formation of secondary aggregate particles, which is not achievable by other treatment method such as a wet treatment process. In a conventional wet treatment process, when the amount of the treating agent is simply increased to increase Si content, aggregation of the fine particles inevitably occurs to give a lower BET specific surface area and a larger apparent primary particle size than before treatment.

The gas phase treatment process, to the contrary, enables the increase of the Si content with little change of the BET specific surface area and with maintenance of primary particle size of the base material.

The Si content in terms of $SiO_2$ is measured by fluorescent X-ray spectrophotometry in the present invention.

The organic silane compound employed in the present invention is suitably selected so as to meet the purpose of surface modification (e.g., control of the electrification properties, charge stabilization under high humidity, etc.) and to have appropriate reactivity. For example, organic silane compounds which do not thermally decompose spontaneously at the reaction temperature, such as alkoxysilane, alkylalkoxy silane, siloxane, silane and silicone oil, are preferable.

Particularly preferred compounds are alkoxysilane compounds which are volatile like a coupling agent and have both a hydrophobic group and a reactive bonding group, represented by the general formula:

$$R_m SiY_n$$

where R is an alkoxy group, m is an integer of from 1 to 3, Y is a hydrocarbon group such as alkyl, hydroxyalkyl, vinyl, glycidoxy, methacryl, and phenyl, and n is an integer of from 1 to 3. The compound is exemplified by vinyltrimethoxysilane, vinyltriethoxysilane, γ-methacryloxypropyltrimethoxysilane, vinyltriacetoxysilane, methyltrimethoxysilane, methyltriethoxysilane, isobutyltrimethoxysilane, dimethyldimethoxysilane, dimethyldiethoxysilane, trimethylmethoxysilane, hydroxypropyltrimethoxysilane, phenyltrimethoxysilane, n-hexadecyltrimethoxysilane, and n-octadecyltrimethoxysilane.

Still more preferred compounds are alkylalkoxysilanes represented by the general formula:

$$C_a H_{2a+1} - Si - (OC_b H_{2b+1})_3$$

where a is an integer of from 4 to 12, b is an integer of from 1 to 3. The preferred alkylalkoxysilanes include n-butyltrimethoxysilane, isobutyltrimethoxysilane, n-butyltriethoxysilane, isobutyltrimethoxysilane, n-pentyltrimethoxysilane, n-pentyltriethoxysilane, n-hexyltrimethoxysilane, n-hexyltriethyoxysilwne, n-heptyltrimethoxysilane, n-heptyltriethoxysilene, n-octyltrimethoxysilane, n-octyltriethoxysilane, n-nonyltrimethoxysilane, n-nonyltriethoxysilane, n-decyltrimethoxysilane, and n-decyltriethoxysilane.

If the number of the carbon atoms a of the alkyl in the above general formula is smaller than 4, the treatment is easy, but sufficient hydrophobicity cannot be obtained, whereas if the number of the carbon atoms is larger than 12, sufficient hydrophobicity is obtained, but the fine particles tend to coalesce to lower the fluidity-imparting property. If the integer b is larger than 3, the reactivity falls, not giving sufficient hydrophobicity. Accordingly, the integer a is preferably in the range of from 4 to 12, more preferably from 4 to 8, and the integer b is preferably from 1 to 3, more preferably from 1 to 2.

The treated fine powdery material in the present invention has an average particle diameter of preferably from 0.005 to 0.1 μm, more preferably from 0.01 to 0.05 μm. If the average particle diameter is larger than 0.1 μm, the fluidity of the powdery material decreases to result in non-uniform electrification of the toner, which give rise to scattering of the toner and fogging of the images, not giving high-quality toner images. If the average particle diameter is smaller than 0.005 μm, the treated powder particles tend to be embedded in the surface of the colorant-containing resin particles to accelerate toner deterioration and to lower the durability. This tendency is remarkable especially when the fine powdery material is employed in a sharp-melting color toner.

The particle diameter of the treated powdery material is measured by transmission electron microscopy.

The toner of the present invention contains preferably the treated fine powdery material in an amount of from 0.05 to 10 parts by weight, more preferably from 0.1 to 5 parts by weight to 100 parts by weight of the colorant-containing particulate resin in view of the improvement or adjustment of the fluidity of the toner, and the triboelectrification properties.

The toner of the present invention which is to be negatively charged contains preferably a charge controlling agent for stabilization of negative electrification characteristics. The negative charge-controlling agent includes organometal complexes and salts thereof such as metal complexes of an alkyl-substituted salicylic acids and salts thereof; e.g., chromium complexes, zinc complexes, iron complexes, chromium salts, zinc salts, and iron salts of di-t-butylsalicylic acid.

The toner of the present invention which is to be positively charged contains preferably an charge controlling agent such as nigrosin type compounds, triphenylmethane type compounds, rhodamine dyes, and polyvinylpyridines. For the color toners, the charge controlling agent is preferably colorless or pale colored, not to affect the color tone of the toner.

The colorant for the toner includes cyan colorants such as phthalocyanine blue, indanthrene blue, and peacock blue; magenta colorants such as permanent red, lake red, and rhodamine red; and yellow colorants such as hansa yellow, permanent yellow, and benzidine yellow. The contents of the colorants are not more than 12 parts, preferably from 0.5 to 9 parts by weight for 100 parts of the binder resin of the color toner since the content affects sensitively to the light transmittance of the OHP film.

The toner of the present invention may contain other additives, if necessary, within an amount that does not impair the properties of the toner. The additives includes electrification aids, e.g., particulate organic resins, metal oxides, etc.; lubricants, e.g., teflon, zinc stearate, polyvinylidene fluoride, etc.; and fixing aids, e.g., low molecular polyethylene, low molecular polypropylene, etc.

The colorant-containing particulate resin, and the particulate toner can be produced by various processes: a process in which constituents are blended by heat-blending machine such as a heat roll, a kneader, and an extruder, then the blended matter is pulverized mechanically, and the resulting powdery matter is classified; another process in which a colorant and other materials are dispersed in a solution of a binder resin, and the solution is spray-dried; still another process in which necessary materials are mixed with a polymerizable monomer for the binder resin, and the emulsified suspension of the monomer composition is polymerized by a suspension polymerization process.

The toner has a weight-average particle diameter of from 3 to 15 μm, more preferably from 4 to 12 μm.

The binder resin for the colorant-containing particulate resin may be any conventional resin employed as the binder resin for usual toners for electrophotography, including styrene type copolymers. e.g., polystyrene, styrene-butadiene copolymers, styrene-acrylate copolymers, styrene-methacrylate copolymers, etc.; polyethylene polymers; ethylene copolymers, e.g., ethylene-vinyl acetate copolymers, ethylene-vinyl alcohol copolymers, etc.; phenol resins, epoxy resins, acrylphthalate resins, polyamide resins, polyester resins, and maleic acid resins. The process for producing the above resins is not specially limited.

Of the binder resins, styrene copolymers, polyester resins, and mixtures thereof are preferred from the standpoint of fixability, triboelectrification of the colorant-containing resin particles (or toner particles), and so forth. Of the above resins for toners to be negatively charged, polyester resins which tend to have a large amount of negative charge give full benefit of the present invention. Although the polyester resin has excellent fixability and is suitable as a color toner binder resin, it has high negative electrification ability and the amount of triboelectricity tends to be excess. This disadvantage is removed by mixing the resin particles with the treated fine powdery material of the present invention, thereby an excellent toner being prepared.

In particular, the polyester resins are preferred which are prepared by copolycondensation of a bisphenol derivative or substituted bisphenol represented by the formula below as the diol component:

(where R and R' are independently an ethylene group or a propylene group; x and y are independently an integer of 1 or more; and the average of (x+y) ranges from 2 to 10), with a carboxylic acid component selected from two or more valent carboxylic acids, acid anhydride or lower alkyl ester thereof (e.g., fumaric acid, maleic acid, maleic anhydride, phthalic acid, terephthalic acid, trimellitic acid, pyromellitic acid, etc.) in view of the sharp melting characteristics.

The carrier combinedly used with the toner of the present invention is composed of a material such as surface-oxidized or unoxidized iron; metals including iron, nickel, copper, zinc, cobalt, manganese, chromium, rare earth metals and their alloys; oxides of the metals, and ferrite. The process for producing the carrier is not specially limited.

The surface of the carrier particles is coated with a resin by any of conventional methods, for example, by dissolving or suspending a coating material such as a resin in a solvent and applying it on a carrier, or by simple mixing in a powder state.

The material to be attached to the carrier particle surface includes polytetrafluoroethylene, monochlorotrifluoroethylene polymers, polyvinylidene fluoride, silicone resins, polyester resins, metal complexes of di-t-butylsalicylic acid, styrene resins, acrylate type resins, polyamides, polyvinylbutyral, aminoacrylate resins, basic dyes and their lakes, nigrosine, fine powdery silica, and fine powdery alumina. These materials may be used singly or in combination thereof.

The aforementioned material is used preferably in total amount ranging from 0.1 to 30% by weight, more preferably from 0.5 to 20% by weight, based on the carrier.

The carrier has an average particle diameter of preferably from 10 to 100 μm, more preferably from 20 to 70 μm.

Particularly preferred carriers are coated magnetic ferrites such as of a ternary system of Cu—Zn—Fe, the surface of which is coated with a resin mixture in an amount of 0.01 to 5%, preferably 0.1 to 1% by weight of the carrier, and which contain particles of smaller than 250 mesh and not smaller than 400 mesh in an amount of not less than 70% by weight. The coating resin for the preferred carrier is a mixture of a silicone resin or a fluorine resin with a styrene resin or the like (e.g., polyvinylidene fluoride with a styrene-methyl methacrylate resin; polytetrafluoroethylene with a styrene methacrylate resin; fluorine type copolymer with a styrene type copolymer) in a ratio ranging from 90:10 to 20:80, preferably from 70:30 to 30:70. The fluorine type copolymer is exemplified by vinylidene fluoride-tatrafluoroethylene copolymers (10:90 to 90:10). The styrene copolymer is exemplified by styrene/2-ethylhexyl acrylate copolymer (20:80 to 80:20), and styrene/2-ethylhexyl acrylate/methyl methacrylate terpolymer (20 to 60:5 to 30:10 to 50).

The above coated ferrite carrier, when it has sharp particle size distribution, has satisfactory triboelectrification characteristics for the toner of the present invention and improves electrophotographic characteristics of the toner.

In producing the two-component developer of the present invention by mixing the toner with the carrier, the mixing ratio of the toner is in the range of from 2 to 15%, preferably from 4 to 13% by weight of the developer to obtain the desired results. If the toner concentration is lower than 2% by weight, the image density is tends to be lower, whereas, if the toner concentration is higher than 15% by weight, fogging of the image and scattering of toner in the apparatus tends to occur and the useful life of the developer becomes short.

The apparatus for development with non-magnetic one-component toner of the present invention is described by reference of an example, without limiting the invention thereto.

Figure 1:
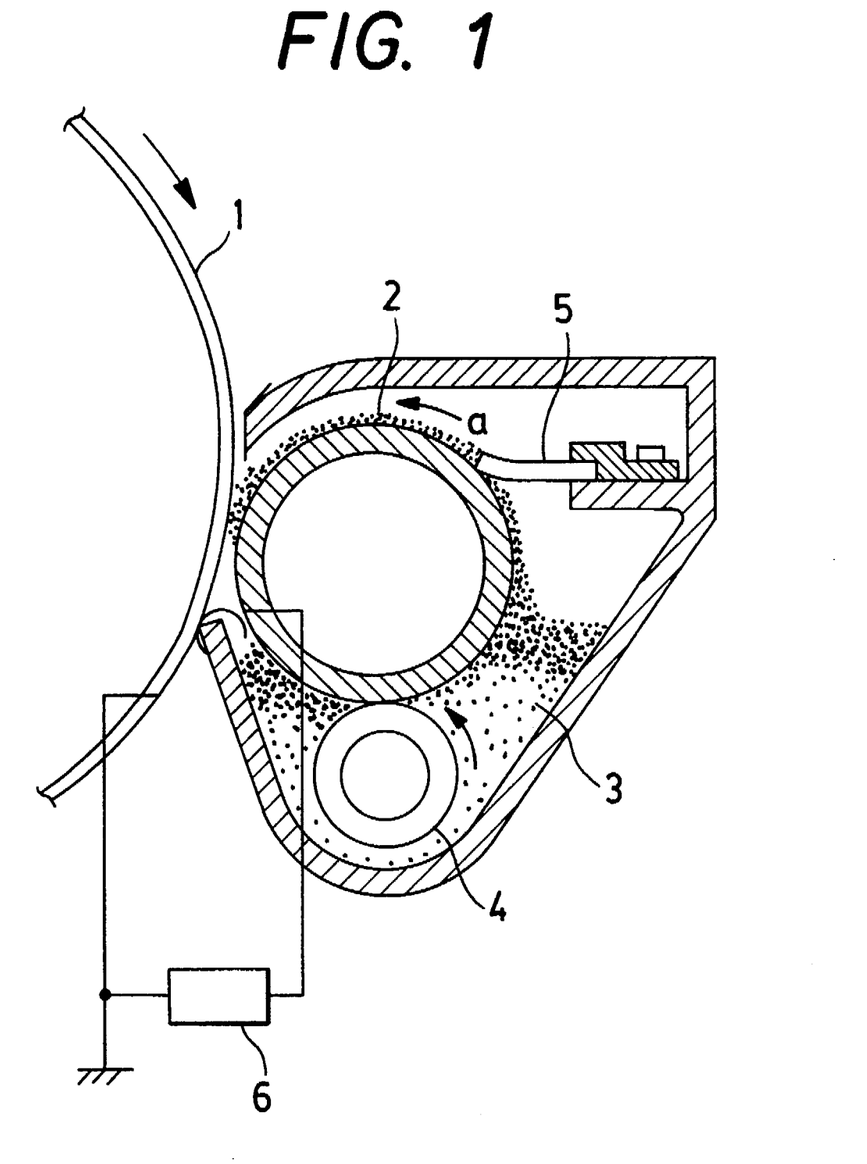
FIG. 1 illustrates schematically an example of a developing device for image development with a non-magnetic one-component toner.

FIG. 1 illustrates an apparatus for developing a positively charged image formed on a latent image holding member 1. The latent image is formed on the latent image-holding member 1 by an electrophotographic process means or an electrostatic recording means not shown in the drawing. A developer-holding member 2 is a non-magnetic sleeve made of a material like aluminum or stainless steel. A non-magnetic one-component color toner is stored in a hopper 3, and is fed to the developer-holding member 2 by a feed roller 4. The feed roller 4 also serves to remove, after the development, the remaining toner from developer-holding member 2. The toner fed onto the developer-holding member 2 is applied uniformly thereon in a thin film by a developer-applying blade 5. The contact pressure between the developer-applying blade 5 and the developer-holding member 2 is effective in the range of from 3 to 250 g/cm, preferably 10 to 120 g/cm as the line pressure in the direction of sleeve generatrix. At the contact pressure of lower than 3 g/cm, the toner is liable not to be uniformly applied, and to have broad charge distribution thus causing fogging of the image and scattering of the toner. At the contact pressure of higher than 250 g/cm, unnecessary high pressure is applied to the toner to cause undesirable aggregation or pulverization of the toner. At the contact pressure of 3 to 250 g/cm, aggregation of the particles of small diameter is disintegrated well, whereby the triboelectrification of the toner is instantaneously achieved. The developer-applying blade 5 is preferably made of a material of a triboelectric series suitable for electrifying the toner to the desired polarity. The suitable material is exemplified by silicone rubber, urethane rubber, styrene-butadiene rubber, and the like. Use of an electroconductive rubber is desirable to prevent excessive triboelectrification of the toner. The surface of the blade 5 may be coated if necessary. For a negatively electrifiable toner, the blade is preferably coated with a positively electrifiable resin such as a polyamide resin.

In the system making a thin toner layer on the developer-holding member 2 with the blade 5, in order to obtain sufficient image density, the thickness of the toner layer on the developer-holding member 2 is preferably made smaller than the facing gap width between the developer-holding member 2 and the latent image-holding member 1, where alternate electric field is applied. In FIG. 1, a bias power source 6 is used to apply a development bias of an alternate electric field or an alternate electric field superposed with a direct electric field between the developer-holding member 2 and the latent image-holding member 1, which facilitates the toner transfer from the developer-holding member 2 onto the latent image-holding member 1 and enables formation of high-quality images.

Figure 2:
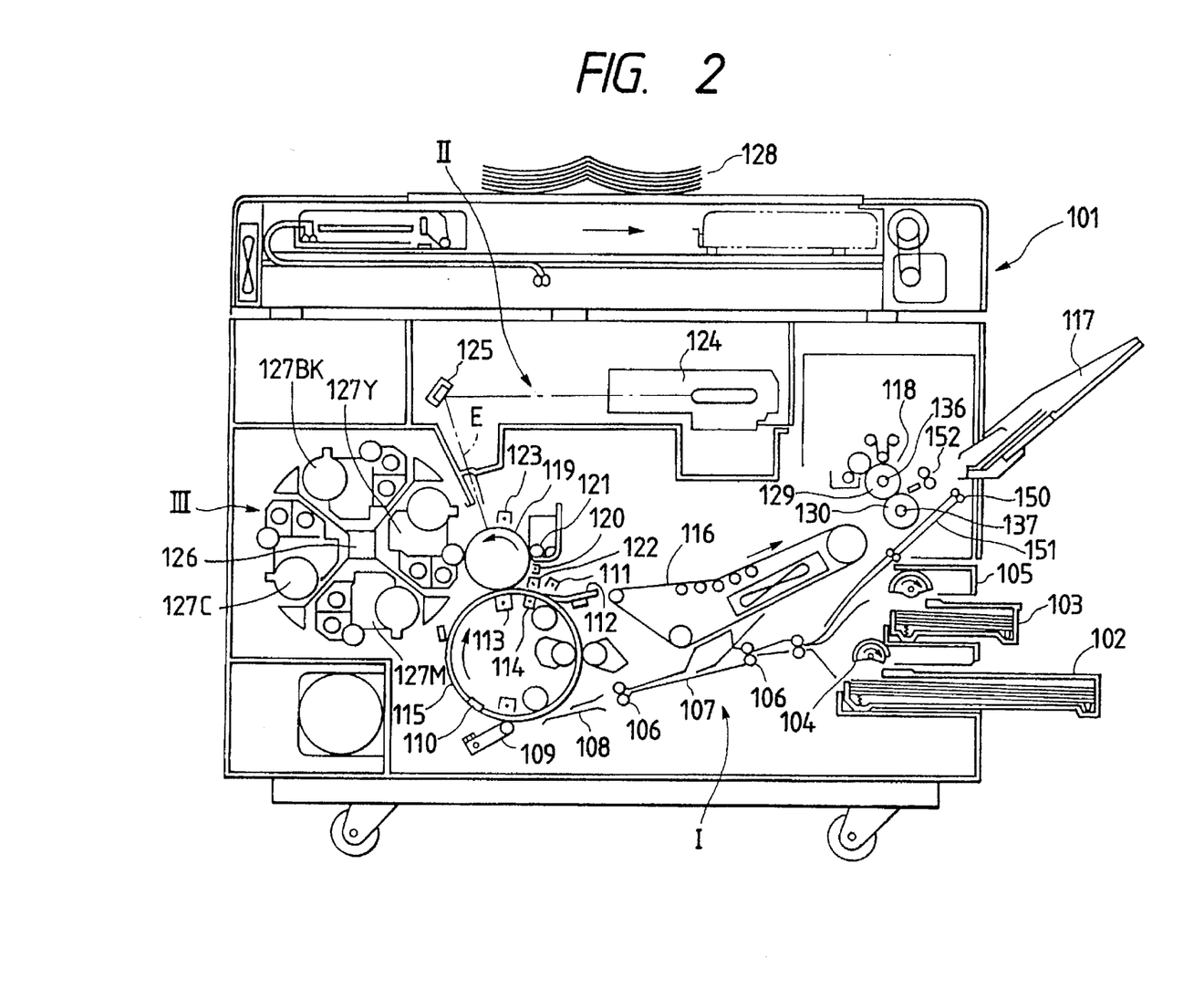
FIG. 2 illustrates schematically an example of a developing device for image development with a two-component toner.

Next, an image forming apparatus is explained which is suitable for use for two-component developer comprising a toner and a magnetic carrier, by reference to FIG. 2.

The color electrophotographic apparatus shown in FIG. 2 comprises three sections: a delivery section I for delivering a transfer-receiving medium positioned at the right portion (in FIG. 2) of the main body 101 of the apparatus; a latent image-forming section II positioned at the middle portion of the main body in proximity to the transfer drum 115 constituting the above delivery section I; and a developing section III (rotating developing apparatus) positioned in proximity to the image-forming section II.

The delivery section I is constituted as follows. In FIG. 2, on the right side wall of the main body 101 of the apparatus, an opening is provided. At the opening a detachable trays 102, 103 for feeding a transfer-receiving medium are provided, which are partly protruding outside the apparatus. Feeding rollers 104, 105 for feeding the transfer-receiving medium (paper sheets) are provided above the trays 102, 103. Feeding rollers 106 and feeding guides 107, 108 serve to feed the transfer-receiving medium from the trays to a transfer drum 115 provided on the left. Along the external peripheral face of the transfer drum 115, a contacting roller 109, a gripper 110, a charger 111 for separating the transfer-receiving medium, and a separation nail 112 are successively provided in this order along the drum rotation direction. A charger 113 for transfer, and a charger 114 for transfer-receiving medium separation are provided at the inside peripheral face of the drum 115. On the portion of the transfer drum where the transfer-receiving medium is brought into contact, a transfer sheet (not shown in the drawing) formed from a polymer like polyvinylidene fluoride is stuck. The transfer-receiving medium is allowed to adhere electrostatically onto the transfer sheet. A delivery belt means 116 is provided near the separation nail on the upper right of the transfer drum 115. A fixation device 118 is provided at the right end in the delivery direction of the delivery belt means 116. Further after the fixation device 118, a output tray 117 is provided which is detachable and extending outside the main body 101 of the apparatus.

The latent image formation section II has the construction as follows. As shown in FIG. 2, a photosensitive drum 119 (e.g., OPC photosensitive drum) which is a latent image holding member freely rotatable in the arrow mark direction is provided in contact with the external peripheral face of the transfer drum 115. Near the external peripheral surface of the photosensitive drum 119, a charge eliminator 120, a cleaning means 122, and a primary charger 123 are provided successively in this order. Further, an image light exposure means 124 like a laser beam scanner and an image exposure light reflection means 125 like a mirror are provided for forming an electrostatic latent image on the external face of the photosensitive drum 119.

The rotating developing apparatus III has the construction as follows. A rotatable case 126 (hereinafter referred to as a "rotating member") at a position opposing to the external face of the photosensitive drum 119. In the rotating member, 126, four developing devices are mounted at four positions in a peripheral direction to visualize (or develop) the electrostatic latent image formed on the external face of the photosensitive drum 119. The four developing devices include a yellow developing device 127Y having a yellow color and a magnetic carrier, a magenta developing device 127M having a magenta toner and a magnetic carrier, a cyan developing device 127C having a cyan toner and a magnetic carrier, and a black developing device 127BK having a black toner and a magnetic carrier.

The sequence of the entire image forming apparatus having the above constitution is explained by reference to a case of full-color mode as an example. As the aforementioned photosensitive drum 119 rotates in the arrow direction in FIG. 2, the photosensitive member on the photosensitive drum is electrified by the primary charger 123. In the apparatus shown in FIG. 2, the speed of motion of the respective parts (hereinafter referred to as "process speed") is not lower than 100 mm/sec (e.g., 130 to 250 mm/sec). After the photosensitive drum 119 is electrified by the primary charger 123, a laser beam modulated by a yellow image signal from the original 128 is projected imagewise onto the photosensitive drum 119 to form an electrostatic latent image thereon. Then with the rotation of the rotating member 126, the above electrostatic latent image is developed by an yellow developing device 127Y set at a predetermined developing position to form a yellow toner image.

The transfer-receiving medium which is delivered through the paper guide 107, the paper-feeding roller 106, and the paper guide 108 is held by the gripper 110 at a predetermined moment, and is fasten electrostatically around the transfer drum by action of the contacting roller 109 and the electrode counterposed to the contacting roller 109. The transfer drum 115 rotates synchronously with the photosensitive drum 119 in the arrow direction shown in FIG. 2. The yellow toner image formed by the yellow developing device 127Y is transferred on the transfer-receiving medium by the transfer charger at the position where the external peripheral face of the photosensitive drum 119 is brought into contact with the external peripheral face of the transfer drum 115. The transfer drum 115 continues to rotate and made ready for image transfer in another color (magenta in FIG. 2).

The photosensitive drum 119 is destaticized by the charge eliminator 120, cleaned by the cleaning blade of the cleaning means 121, and then is charged again by the primary charger 123. On the photosensitive drum 119, light is projected imagewise in accordance with magenta image signals to form an electrostatic image. The rotatable developing device rotates during the electrostatic latent image formation by light image exposure in accordance with magenta image signals to place the magenta developing device 127M at the aforementioned development position to develop the latent image with the magenta toner. Successively, the above process is conducted respectively for cyan color and black color to conduct transfer of total four color toner images.

After transfer of the four color toner images, the four-color developed image formed on the transfer-receiving medium is destaticized by the chargers 122, 114. Thereby, the transfer-receiving medium fastened by the gripper 110 is released and is separated by the separating nail 112 from the transfer drum 115, and then is sent to the fixation device 118. There the image is fixed by heat and pressure. Thus the sequence of full-color printing is completed to give a desired full color print image on one face of the transfer-receiving medium.

The fixation speed in the fixation device 118 is lower than the process speed in the main body. (For example, the fixation speed is 90 mm/sec in comparison with the process speed of 160 mm/sec.) This is because sufficient heat needs to be applied to the toner for melt-mixing the color of the two- to four-layered unfixed image. More heat is applied to the toner by lowering the fixation speed in comparison with the developing speed.

Figure 3:
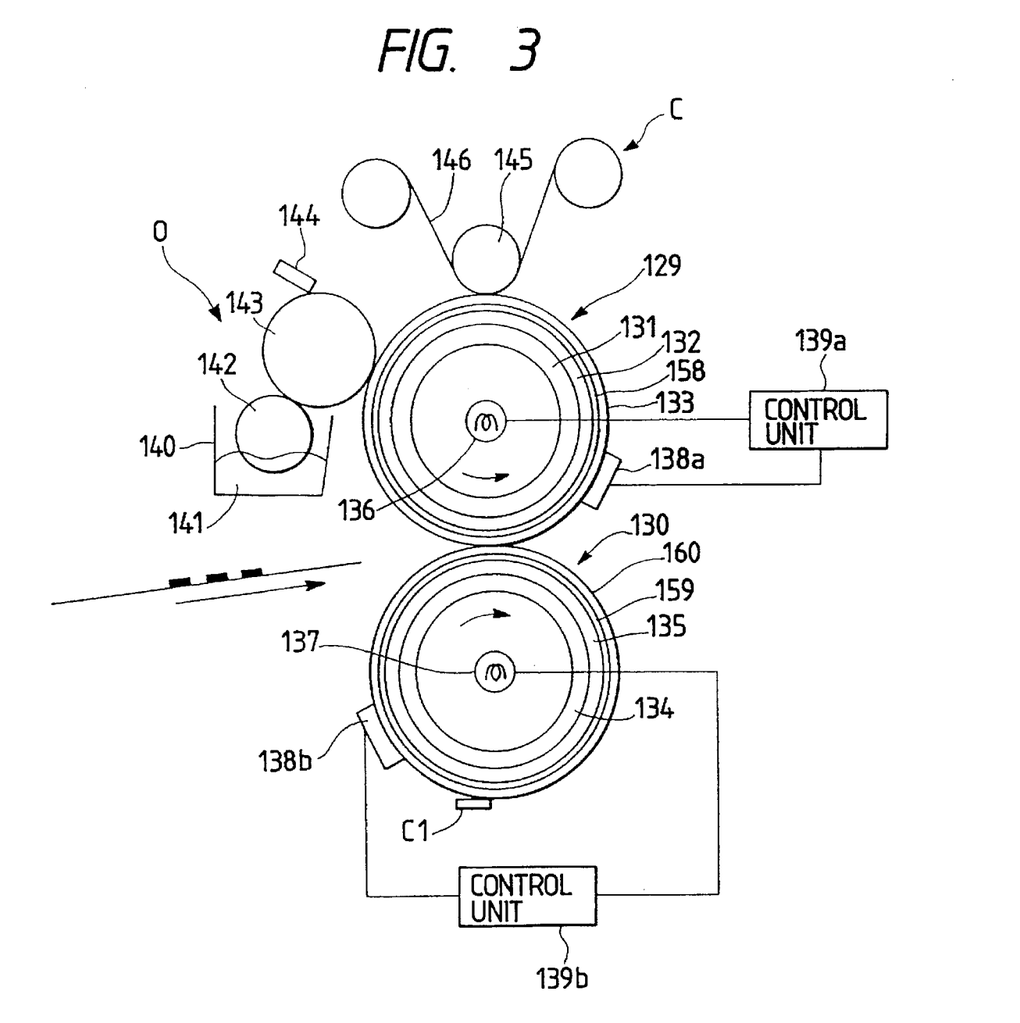
FIG. 3 is an enlarged drawing of the fixing means of the image development device shown in FIG. 2.

In FIG. 3, a fixation roller 129 as the fixation means, for example, has a diameter of 60 mm, and is constructed from an aluminum metal core 131 of 5 mm thick, an RTV silicone rubber layer 132 (room temperature vulcanization type) of 2 mm thick formed thereon, a fluororubber layer 158 of 50 μm thick formed further thereon, and an HTV silicone rubber layer 133 (high temperature vulcanization type) of 230 μm thick further thereon.

The press roller 130 as the pressing means, for example, has a diameter of 60 mm, and is constructed from an aluminum metal core 134 of 5 mm thick, an RTV silicone rubber layer 135 of 2 mm thick formed thereon, a fluororubber layer 159 of 50 μm thick formed further thereon, and an HTV silicone rubber layer 160 of 230 μm thick further thereon.

The fixation roller has a halogen heater 136 as a heating means in the metal core, and the press roller has similarly a halogen heater 137 as the heating means in the core metal, and heating is conducted from both sides. The temperatures of the fixation roller 129 and the press roller 130 are controlled at a constant temperature (e.g., 160° C.±10° C.) by controlling the halogen heaters 136, 137 by controlling units 139a, 139b in accordance with the temperatures detected by thermistors attached to the rollers. The fixation roller 129 and the press roller 130 are pressed together at a total pressure of about 40 kg by a press means (not shown in the drawing).

In FIG. 3, the symbol O denotes an oil-applying device as the releasing agent-applying means; the symbol C denotes a cleaning device; and the symbol C1 denotes a cleaning blade to remove oil and smear adhering onto the press roller. The oil-applying device O applies dimethylsilicone oil 141 (e.g., KF96 300 cs, produced by Shin-Etsu Chemical Co., Ltd.) taken up by an oil take-up roller 142 from an oil pan 140 and spread by an oil-applying roller 143, onto the fixation roller 129 with the application amount controlled by an oil application controlling blade 144.

The cleaning device C cleans the fixation roller 129 by pressing a nonwoven web 146 of Nomex (trade name) against the fixation roller 129 by means of a press roller 145. The web is wound up suitably by a winding device (not shown in the drawing) to prevent accumulation of the toner or the like at the contact area.

The present invention is described more specifically by reference to Examples. In Examples, "%" and "part" are based on weight.

EXAMPLE 1

Titanium tetraisopropoxide was used as the raw material and was fed gradually by a chemical pump with nitrogen as the carrier gas into a vaporizer kept at 200° C. to vaporize the raw material completely. Separately, water was fed with nitrogen as the carrier gas to another vaporizer by a chemical pump and was vaporized. The above vaporized raw material and the vaporized water are together sent into a reactor to cause thermal decomposition at a temperature of 280° C. The reaction mixture was quenched to obtain fine powdery titanium oxide A. The composition thereof is shown in Table 1.

EXAMPLE 2

Fine powdery titanium oxide B was prepared in the same manner as in Example 1 except that titanium tetra-n-propoxide was used in place of titanium tetraisopropoxide, the vaporizer temperature was changed to 220° C., and the reactor temperature was changed to 300° C.

EXAMPLE 3

Fine powdery titanium oxide C was prepared in nearly the same manner as in Example 1 except that the thermal decomposition temperature was 650° C.

EXAMPLE 4

Fine powdery titanium oxide D was prepared in the same manner as in Example 1 except that the thermal decomposition product was not quenched.

EXAMPLE 5

Fine powdery titanium oxide E was prepared in nearly the same manner as in Example 1 except that the thermal decomposition temperature was 200° C. and a smaller amount of water was fed to the reactor.

EXAMPLE 6

Fine powdery titanium oxide F was prepared in nearly the same manner as in Example 1 except that the thermal decomposition temperature was lowered from 280° C. to 170° C. and the amount of titanium tetraisopropoxide fed to the reactor was increased.

Comparative Example 1

Fine powdery titanium oxide G was prepared by thermal decomposition of titanium tetrachloride in gas phase at 800° C.

Comparative Example 2

Fine powdery titanium oxide H was prepared by a sulfate process in which an aqueous titanium sulfate solution was neutralized and the resulting precipitate was fired.

The data of the respective fine powdery materials are shown in Table 1.

EXAMPLE 7

Titanium tetraisopropoxide was used as the raw material and was fed gradually by a chemical pump with nitrogen as the carrier gas into a vaporizer kept at 200° C., and was vaporized completely. Water was fed with nitrogen as the carrier gas to another vaporizer by a chemical pump, and was vaporized. The water vapor was further heated, and were sent together with the vaporized titanium tetraisopropoxide into a reactor to cause thermal decomposition at a temperature of 280° C. Separately, isobutyltrimethoxysilane as a surface-treating agent was fed by a chemical pump with nitrogen as the carrier gas to a vaporizer, and was completely vaporized. It was mixed with the above nitrogen gas stream containing the synthesized fine powdery material and the heated water vapor to cause a reaction at 280° C. for hydrophobicity treatment. Then the mixture was quenched, and hydrophobicity-treated fine powdery material I was collected of which surface was modified with isobutyltrimethoxysilane. The composition thereof is shown in Table 2.

EXAMPLE 8

A hydrophobicity-treated fine powdery material J was prepared in the same manner as in Example 7 except that propyltriethoxysilane was used in place of isobutyltrimethoxysilane.

EXAMPLE 9

A hydrophobicity-treated fine powdery material K was prepared in the same manner as in Example 7 except that titanium tetra-n-propoxide was used in place of titanium tetraisopropoxide, the vaporizer temperature was 220° C., and the reactor temperature was 300° C.

EXAMPLE 10

To the fine powdery titanium oxide A prepared in Example 1 in an aqueous system, a coupling agent (n-butyltrimethoxy-silane) was added with stirring in an amount of 20% by weight of the fine powdery material not to cause coalescence of the particles. The mixture was dried and disintegrated to obtain hydropobicity-treated fine powdery material L.

EXAMPLE 11

A hydrophobicity-treated fine powdery material M was prepared in nearly the same manner as in Example 7 except that the feeding rate and amount of the raw material titanium tetrapropoxide were increased and the quenching was not conducted after the thermal decomposition.

Separately, a fine powdery material without the surface treatment was prepared. This product was found to contain $TiO_2$ component at a content of 90.2% by weight, and $Ti(OR)_m(OH)_n$ component at a content of 7.2% by weight.

Comparative Example 3

A hydrophobicity-treated fine powdery titanium oxide N was prepared by treating the fine powdery titanium oxide G obtained in Comparative Example 1 with octyltrimethoxysilane by wet process.

Comparative Example 4

A hydrophobicity-treated fine powdery titanium oxide O was prepared by treating the fine powdery titanium oxide H obtained in Comparative Example 2 for hydrophobicity with octyltrimethoxysilane by wet process.

The data of the above hydrophobic fine powdery titanium oxides are shown in Table 2.

EXAMPLE 12

Preliminarily the materials below were mixed sufficiently with a Henschel mixer:

| | |
|---|---|
| Polyester resin prepared by condensation of propoxylated bisphenol with fumaric acid | 100 parts |
| Phthalocyanine pigment | 4 parts |
| Chromium complex of di-t-butyl salicylate | 4 parts |

The mixture was melt-blended by a double-screw extruder, and was crashed after cooling by a hammer mill to a size of about 1 to 2 mm, and further, the mixture was finely pulverized by an air-jet type pulverizer. The pulverized matter was classified to obtain a colorant-containing particulate resin having a weight-average particle size of about 8 μm.

100 Parts by weight of this colorant-containing particulate resin and 0.5 part by weight of the hydrophobicity-treated fine powdery material I obtained in Example 7 were mixed by a Henschel mixer to form a cyan toner. This cyan toner had a weight-average particle diameter of 8 μm. By SEM, it was observed that the hydrophobicity-treated powdery material was uniformly adhering in a primary particle state on the surface of the colorant-containing particulate resin.

Two component developer was prepared by mixing 95 parts of this coated magnetic ferrite carrier and 5 parts of the above cyan toner where the carrier was prepared by coating a Cu—Zn—Fe type magnetic ferrite carrier of average particle diameter of about 50 μm with a styrene type copolymer in an amount of 0.5%, the copolymer being composed of 50% by weight of styrene, 20% by weight of methyl methacrylate, and 30% by weight of 2-ethylhexyl acrylate.

With this developer, an image was formed by means of a commercial plain paper color copying machine (Color Laser Copier 550, manufactured by Canon K.K.) at a development contrast of 300 V, temperature 23° C., and humidity of 65% RH. The formed image was measured for reflection density using McBeth RD-918 Model Reflectometer with an SPI filter. (The image density was measured hereinafter in the same manner.) The toner image was clear, and the image density was as high as 1.52 without fogging. Further when 10,000 sheets of copying was continuously conducted, the fluctuation of the image density was within 0.08 and copied images were all as good as the initial image in view of fogging and sharpness.

Under low temperature and low humidity (20° C., and 10% RH) an image was formed at development contrast of 300 V. The formed image had an image density of as high as 1.44, therefore the charge control being also effective at the low-temperature and low-humidity conditions.

Under high-temperature and high-humidity conditions (30° C., 80% RH), an image was formed similarly at the development contrast of 300 V. The formed image was sufficiently stable and excellent with the image density of 1.54.

Onto an OHP film, a cyan toner image was transferred, and fixed. The image was projected onto a screen by an overhead projector, and a sharp cyan image was projected on the screen.

After one month storage under the environmental conditions of 23° C., 60% RH; 20° C., 10% RH; or 30° C., 80% RH, the initial image was all right.

The results are shown in Table 3.

EXAMPLES 13 AND 14

Toners and two-component developers were prepared in the same manner as in Example 12 except that the surface-modified fine powdery material J or K is used. The tests were conducted in the same manner as in Example 12. The results were satisfactory.

EXAMPLE 15

A toners and a two-component developer were prepared in the same manner as in Example 12 except that the surface-modified treated fine powdery material L is used. The tests were conducted in the same manner as in Example 12.

The surface treatment stabilized the electrification properties under high-temperature and high-humidity conditions (30° C., 80% RH) to give image density of about 1.5 stably. However, under low-temperature and low-humidity conditions (20° C., 10% RH), the quality of the toner image gradually deteriorated during the repeated image formation in comparison with that in Example 12. This is considered due to the decreased fluidity and the decreased transfer properties of the toner in comparison with that of Example 12.

By SEM, aggregates of several particles of the treated fine powdery material were observed on the toner surface, and the ratio of the primary particles adhering on the surface is lower than that in Example 12.

EXAMPLE 16

A toner and a two-component developer were prepared in the same manner as in Example 12 except that the surface-modified treated fine powdery material M is used. The tests were conducted in the same manner as in Example 12.

The toner image was somewhat inferior in fine line reproduction and half tone reproduction to those in Example 12. The image quality was improved, however, by increasing the ratio of the treated fine powdery material to the colorant-containing particulate resin from 0.5 part to 1.0 part.

Comparative Example 5

The test was conducted in the same manner as in Example 12 except that hydrophobic fine powdery titanium oxide O was used. As a result, the image quality was lowered under low-temperature and low-humidity conditions, and it also deteriorated during many sheets of copying.

Comparative Example 6

The test was conducted in the same manner as in Example 12 except that hydrophobic fine powdery titanium oxide P was used. As the results, the image quality deteriorated under low-temperature and low-humidity conditions, and during many sheets of image formation.

The results of Examples 12 to 16 and Comparative Examples 5 and 6 are shown in Table 3.

Comparative Example 7

An untreated fine powdery material P was prepared in the same manner as in Example 7 except that the hydrophobicity treatment with isobutyltrimethoxysilane was not conducted.

A cyan toner was prepared by mixing 100 parts by weight of a colorant-containing particulate resin prepared in the same manner as in Example 12 and 0.5 part by weight of the fine powdery material P by means of a Henschel mixer. Further, a two-component developer was prepared by mixing 5 parts of the cyan toner with 95 parts by weight of a coated magnetic ferrite carrier in the same manner as in Example 12. The resulting developer was evaluated in the same manner as in Example 12. The results are shown in Table 3.

Comparative Example 8

An untreated fine powdery material Q was prepared in the same manner as in Example 9 except that the hydrophobicity treatment with isobutyltrimethoxysilane was not conducted.

A cyan toner was prepared by mixing 100 parts by weight of a colorant-containing particulate resin prepared in the same manner as in Example 12 and 0.5 part by weight of the fine powdery material Q by means of a Henschel mixer. Further, a two-component type developer was prepared by mixing 5 parts of the cyan toner with 95 parts by weight of a coated magnetic ferrite carrier in the same manner as in Example 12. The resulting developer was evaluated in the same manner as in Example 12. The results are shown in Table 3.

Comparative Example 9

An untreated fine powdery material R was prepared by thermal decomposition of titanium tetrachloride in gas phase at 800° C.

A cyan toner was prepared by mixing 100 parts by weight of a colorant-containing particulate resin prepared in the same manner as in Example 12 and 0.5 part by weight of the fine powdery material R by means of a Henschel mixer. Further, a two-component developer was prepared by mixing 5 parts of the cyan toner with 95 parts by weight of a coated magnetic ferrite carrier in the same manner as in Example 12. The resulting developer was evaluated in the same manner as in Example 12. The results are shown in Table 3.

Comparative Example 10

An untreated fine powdery material S was prepared by a sulfate process neutralizing an aqueous solution of titanium sulfate and firing the formed precipitate.

A cyan toner was prepared by mixing 100 parts by weight of a colorant-containing particulate resin prepared in the same manner as in Example 12 and 0.5 part by weight of the fine powdery material S by means of a Henschel mixer. Further, a two-component type developer was prepared by mixing 5 parts of the cyan toner with 95 parts by weight of a coated magnetic ferrite carrier in the same manner as in Example 12. The resulting developer was evaluated in the same manner as in Example 12. The results are shown in Table 3.

Comparative Example 11

An untreated fine powdery material S was prepared by wet process treating the hydrophilic fine powdery titanium oxide R with octylmethoxysilane for hydrophobicity.

A cyan toner was prepared by mixing 100 parts by weight of a colorant-containing particulate resin prepared in the same manner as in Example 12 and 0.5 part by weight of the fine powdery material S by means of a Henschel mixer. Further, a two-component type developer was prepared by mixing 5 parts of the cyan toner with 95 parts by weight of a coated magnetic ferrite carrier in the same manner as in Example 12. The resulting developer was evaluated in the same manner as in Example 12. The results are shown in Table 3.

EXAMPLE 17

A treated fine powdery material T was prepared in the same manner as in Example 7 except that the amount of the feed of isobutyltrimethoxysilane was decreased extremely.

A cyan toner was prepared by mixing 100 parts by weight of a colorant-containing particulate resin prepared in the same manner as in Example 12 and 0.5 part by weight of the treated fine powdery material T by means of a Henschel mixer. Further, a two-component type developer was prepared by mixing 5 parts of the cyan toner with 95 parts by weight of a coated magnetic ferrite carrier in the same manner as in Example 12. The resulting developer was evaluated in the same manner as in Example 12. The results are shown in Table 3.

EXAMPLE 18

A treated fine powdery material U was prepared in the same manner as in Example 7 except that the thermal decomposition of titanium tetraisopropoxide temperature was carried out at 200° C. and the water feeding to the reactor was decreased. Similarly, a fine powdery material which was not surface-treated was synthesized and was analyzed. This material contained the $TiO_2$ component at a content of 86.0% by weight and the $Ti(OR)_m(OH)_n$ component at a content of 12.7% by weight.

A cyan toner was prepared by mixing 100 parts by weight of a colorant-containing particulate resin prepared in the same manner as in Example 12 and 0.5 part by weight of the treated fine powdery material U by means of a Henschel mixer. Further, a two-component type developer was prepared by mixing 5 parts of the cyan toner with 95 parts by weight of a coated magnetic ferrite carrier in the same manner as in Example 12. The resulting developer was evaluated in the same manner as in Example 12. The results are shown in Table 3.

EXAMPLE 19

A treated fine powdery material V was prepared similarly except that the thermal decomposition temperature was lowered from 280° C. to 170° C. and an increased amount of the raw material titanium tetraisopropoxide was fed to the reactor. Similarly, a fine powdery material which was not surface-treated with isobutyltrimethoxysilane was synthesized and was analyzed. This material contained the $TiO_2$ component at a content of 82.7% by weight and the $Ti(OR)_m(OH)_n$ component at a content of 15.1% by weight.

A cyan toner was prepared by mixing 100 parts by weight of a colorant-containing particulate resin prepared in the same manner as in Example 12 and 0.5 part by weight of the treated fine powdery material V by means of a Henschel mixer. Further, a two-component type developer was prepared by mixing 5 parts of the cyan toner with 95 parts by weight of a coated magnetic ferrite carrier in the same manner as in Example 12. The resulting developer was evaluated in the same manner as in Example 12. The results are shown in Table 3.

The data of the fine powdery material used in Comparative Examples 7 to 11 and Examples 17 to 19 are shown in Table 4.

TABLE 1

|  | Fine powdery titanium oxide | $TiO_2$ content (wt %) | $Ti(OR)_m(OH)_n$ content (wt %) | Primary particle diameter (μm) |
|---|---|---|---|---|
| Example |  |  |  |  |
| 1 | A | 91.8 | 6.4 | 0.018 |
| 2 | B | 93.3 | 5.2 | 0.020 |
| 3 | C | 98.9 | 0.4 | 0.029 |
| 4 | D | 92.7 | 6.2 | 0.043 |
| 5 | E | 86.0 | 12.7 | 0.048 |
| 6 | F | 82.7 | 15.1 | 0.062 |
| Comparative Example |  |  |  |  |
| 1 | G | 99.5 | 0* | 0.028 |
| 2 | H | 99.5 | 0* | 0.052 |

*Below detection limit

TABLE 2

|  | Hydrophobic fine powdery titanium oxide | $TiO_2$ content (wt %) | $Ti(OR)_m(OH)_n$ content (wt %) | Average particle diameter (μm) | Treating agent | Si content as $SiO_2$ (%) |
|---|---|---|---|---|---|---|
| Example |  |  |  |  |  |  |
| 7 | I | 91.8 | 6.4 | 0.020 | Isobutyltrimethoxysilane | 10.1 |
| 8 | J | 91.8 | 6.4 | 0.020 | Propyltriethoxysilane | 9.8 |
| 9 | K | 92.0 | 5.9 | 0.022 | Isobutyltrimethoxysilane | 8.3 |
| 10 | L | 91.8 | 6.4 | 0.028 | n-Butyltrimethoxysilane | 4.2 |
| 11 | M | 90.2 | 7.2 | 0.055 | Isobutyltrimethoxysilane | 5.6 |
| Comparative Example |  |  |  |  |  |  |
| 3 | N | 99.5 | 0* | 0.032 | Octyltrimethoxysilane | 3.2 |
| 4 | O | 99.5 | 0* | 0.60 | Octyltrimethoxyiilane | 3.0 |

*Below detection limit

TABLE 3

| | External additive (wt parts) | Normal temperature & normal humidity | | Low temperature & low humidity | | High temperature & high humidity | |
|---|---|---|---|---|---|---|---|
| | | Image density | Half tone reproduction | Image density | Half tone reproduction | Image density | Half tone reproduction |
| Example | | | | | | | |
| 12 | *HPTP I (0.5) | 1.52 | Excellent | 1.44 | Excellent | 1.54 | Excellent |
| 13 | HPTP J (0.5) | 1.57 | Excellent | 1.52 | Excellent | 1.62 | Excellent |
| 14 | HPTP K (0.5) | 1.60 | Excellent | 1.57 | Good | 1.66 | Excellent |
| 15 | HPTP L (0.5) | 1.48 | Good | 1.43 | Good → Fair | 1.53 | Good |
| 16 | HPTP M (1.0) | 1.66 | Good | 1.62 | Good | 1.71 | Good |
| Comparative Example | | | | | | | |
| 5 | HPTP N (0.5) | 1.48 | Fair | 1.42 | Poor | 1.56 | Good |
| 6 | HPTP O (0.5) | 1.32 | Fair | 1.30 | Poor | 1.53 | Good |
| 7 | **FP P (0.5) | 1.68 | Fair | 1.58 | Good | 1.84 | Poor |
| 8 | FP Q (0.5) | 1.70 | Fair | 1.59 | Good | 1.77 | Fair → Poor |
| 9 | FP R (0.5) | 1.61 | Poor | 1.45 | Poor | 1.82 | Poor |
| 10 | FP S (0.5) | 1.70 | Poor | 1.52 | Poor | 1.80 | Poor |
| Example | | | | | | | |
| 17 | HPTP T (0.5) | 1.69 | Good | 1.56 | Good | 1.80 | Good → Fair |
| 18 | HPTP U (0.5) | 1.63 | Good | 1.44 | Good → Fair | 1.76 | Good |
| 19 | HPTP V (1.2) | 1.82 | Good → Fair | 1.67 | Good → Fair | 1.92 | Fair |

*HPTP: Hydrophobicity-treated fine powdery material, **FP: Fine powdery material

TABLE 4

| | $TiO_2$ content (wt %) | $Ti(OR)_m(OH)_n$ content (wt %) | Average particle diameter (μm) | Treating agent | Si content as $SiO_2$ (%) |
|---|---|---|---|---|---|
| Fine powdery material P | 91.8 | 6.4 | 0.018 | None | 0 |
| Fine powdery material Q | 92.0 | 5.9 | 0.020 | None | 0 |
| Fine powdery material R | 99.5 | 0* | 0.028 | None | 0 |
| Fine powdery material S | 99.5 | 0* | 0.052 | None | — |
| Treated fine powdery material T | 91.8 | 6.4 | 0.019 | Isobutyltrimethoxysilane | 0.9 |
| Treated fine powdery material U | 86.0 | 12.7 | 0.053 | Isobutyltrimethoxysilane | 2.9 |
| Treated fine powdery material V | 82.7 | 15.1 | 0.066 | Isobutyltrimethoxysilane | 2.8 |

*Below detection limit

What is claimed is:

1. A toner for developing an electrostatic image comprising: a colorant-containing particulate resin and a treated fine powdery material prepared by treating fine powdery titanium oxide with a silane-type organic compound, said fine powdery titanium oxide containing 85 to 99.5% by weight of a $TiO_2$ component and 0.5 to 15% by weight of a $Ti(OR)_m(OH)_n$ component, where R is a hydrocarbon group, m and n are respectively an integer of from 0 to 4 and m+n is 4.

2. The toner according to claim 1, wherein the treated fine powdery material contains the $Ti(OR)_m(OH)_n$ component at a content ranging from 1.0 to 12% by weight.

3. The toner according to claim 2, wherein the treated fine powdery material contains the $Ti(OR)_m(OH)_n$ component at a content ranging from 1.5 to 10% by weight.

4. The toner according to claim 1, wherein the R group in the $Ti(OR)_m(OH)_n$ component is an organic group selected from the group consisting of saturated cyclic hydrocarbon groups, unsaturated cyclic hydrocarbon groups, saturated acyclic hydrocarbon groups, and unsaturated acyclic hydrocarbon groups.

5. The toner according to claim 1, wherein the R group in the $Ti(OR)_m(OH)_n$ component is an alkyl group selected from the group consisting of methyl, ethyl, propyl, and butyl.

6. The toner according to claim 1, wherein the treated fine powdery material is prepared by treatment with an organic silane compound to contain Si at a content ranging from 1 to 18% by weight in terms of $SiO_2$.

7. The toner according to claim 6, wherein the treated fine powdery material is prepared by treatment with an organic silane compound to contain Si at a content ranging from 1.5 to 16% by weight in terms of $SiO_2$.

8. The toner according to claim 7, wherein the treated fine powdery material is prepared by treatment with an organic silane compound to contain Si at a content ranging from 2.5 to 14% by weight in terms of $SiO_2$.

9. The toner according to claim 1, wherein the treated fine powdery material has an average particle diameter ranging from 0.005 to 0.1 µm.

10. The toner according to claim 9, wherein the treated fine powdery material has an average particle diameter ranging from 0.01 to 0.05 µm.

11. The toner according to claim 1, wherein the toner has a weight-average particle diameter ranging from 3 to 15 µm.

12. The toner according to claim 11, wherein the toner has a weight-average particle diameter ranging from 4 to 12 µm.

13. The toner according to claim 1, wherein 0.05 to 10 parts by weight of the treated fine powdery material is mixed with 100 parts by weight of the colorant-containing particulate resin.

14. The toner according to claim 13, wherein 0.1 to 5 parts by weight of the treated fine powdery material is mixed with 100 parts by weight of the colorant-containing particulate resin.

15. The toner according to claim 1, wherein the organic silane compound is selected from the group consisting of alkylalkoxysilanes, siloxanes, silanes, and silicone oils.

16. The toner according to claim 1, wherein the organic silane compound is an alkoxysilane represented by the formula below:

$$R_mSiY_n$$

where R is an alkoxy group, m is an integer of from 1 to 3, Y is alkyl, vinyl, glycidoxy, methacryl, hydroxyalkyl, or phenyl, and n is an integer of from 1 to 3.

17. The toner according to claim 1, wherein the organic silane compound is an alkoxysilane represented by the formula below:

$$C_aH_{2a+1}\text{—}Si\text{—}(OC_bH_{2b+1})_3$$

where a is an integer of from 4 to 12, b is an integer of from 1 to 3.

18. The toner according to claim 17, wherein the organic silane compound is an alkoxysilane selected from the group consisting of n-butyltrimethoxysilane, isobutyltrimethoxysilane, n-butyltriethoxysilane, isobutyltrimethoxysilane, n-pentyltrimethoxysilane, n-pentyltriethoxysilane, n-hexyltrimethoxysilane, n-hexyltriethyoxysilwne, n-heptyltrimethoxysilane, n-heptyltriethoxysilene, n-octyltrimethoxysilane, n-octyltriethoxysilane, n-nonyltrimethoxysilane, n-nonyltriethoxysilane, n-decyltrimethoxysilane, and n-decyltriethoxysilane.

19. The toner according to claim 1, wherein the colorant-containing particulate resin contains a colorant and a binder resin.

20. The toner according to claim 19, wherein the binder resin is a material selected from the group consisting of styrene copolymers, polyester resins, and mixtures thereof.

21. The toner according to claim 19, wherein the binder resin is a polyester resin prepared by polycondensation of at least a dicarboxylic acid and a diol represented by the formula below:

where R and R' are independently an ethylene group or a propylene group; x and y are independently an integer of 1 or more; and the average of x+y ranges from 2 to 10).

22. The toner according to claim 19, wherein the colorant is a yellow colorant, and the colorant-containing particulate resin is a particulate yellow color toner.

23. The toner according to claim 19, wherein the colorant is a magenta colorant, and the colorant-containing particulate resin is magenta color toner particles.

24. The toner according to claim 19, wherein the colorant is a cyan colorant, and the colorant-containing particulate resin is cyan color toner particles.

25. The toner according to claim 1, wherein the colorant-containing particulate resin is color toner particles.

26. The toner according to claim 25, wherein the color toner particles are containing a charge controlling agent.

27. A hydrophobic fine powdery material comprising: a hydrophobic fine powdery titanium oxide prepared by treating a fine powdery titanium oxide with an organic silane compound, said fine powdery titanium oxide being a composition containing 85 to 99.5% by weight of a $TiO_2$ component and 0.5 to 15% by weight of a $Ti(OR)_m(OH)_n$ component, where R is a hydrocarbon group, m and n are respectively an integer of from 0 to 4 and m+n is 4.

28. The hydrophobic fine powdery material according to claim 27, wherein the composition contains the $Ti(OR)_m(OH)_n$ component at a content ranging from 1.0 to 12% by weight.

29. The hydrophobic fine powdery material according to claim 28, wherein the composition contains the $Ti(OR)_m(OH)_n$ component at a content ranging from 1.5 to 10% by weight.

30. The hydrophobic fine powdery material according to claim 27, wherein the R group in the $Ti(OR)_m(OH)_n$ component is an organic group selected from the group consisting of saturated cyclic hydrocarbon groups, unsaturated cyclic hydrocarbon groups, saturated acyclic hydrocarbon groups, and unsaturated acyclic hydrocarbon groups.

31. The hydrophobic fine powdery material according to claim 27, wherein the R group in the $Ti(OR)_m(OH)_n$ component is an alkyl group selected from the group consisting of methyl, ethyl, propyl, and butyl.

32. The hydrophobic fine powdery material according to claim 27, wherein the composition is prepared by thermal decomposition of a titanium alkoxide in a gas phase at a temperature of not higher than 600° C.

33. The hydrophobic fine powdery material according to claim 32, wherein the composition is prepared by thermal decomposition of a titanium alkoxide in a gas phase at a temperature ranging from 200° C. to 400° C.

34. The hydrophobic fine powdery material according to claim 32, wherein the titanium alkoxide is selected from the group consisting of titanium tetramethoxide, titanium tetraethoxide, titanium tetrapropoxide, titanium tetrabutoxide, diethoxytitanium oxide, and mixtures thereof.

35. The hydrophobic fine powdery material according to claim 27, wherein the fine powdery titanium oxide is prepared by treatment with an organic silane compound to contain Si at a content ranging from 1 to 18% by weight in terms of $SiO_2$.

36. The hydrophobic fine powdery material according to claim 35, wherein the fine powdery titanium oxide is prepared by treatment with an organic silane compound to contain Si at a content ranging from 1.5 to 16% by weight in terms of $SiO_2$.

37. The hydrophobic fine powdery material according to claim 36, wherein the treated fine powdery material is prepared by treatment with an organic silane compound to contain Si at a content ranging from 2.5 to 14% by weight in terms of $SiO_2$.

38. The hydrophobic fine powdery material according to claim 27, wherein the organic silane compound is selected from the group consisting of alkylalkoxysilanes, siloxanes, silanes, and silicone oils.

39. The hydrophobic fine powdery material according to claim 27, wherein the organic silane compound is an alkoxysilane represented by the formula below:

$$R_m SiY_n$$

where R is an alkoxy group, m is an integer of from 1 to 3, Y is alkyl, vinyl, glycidoxy, methacryl, hydroxyalkyl, or phenyl, and n is an integer of from 1 to 3.

40. The hydrophobic fine powdery material according to claim 27, wherein the organic silane compound is an alkoxysilane represented by the formula below:

$$C_a H_{2a+1}-Si-(OC_b H_{2b+1})_3$$

where a is an integer of from 4 to 12, b is an integer of from 1 to 3.

41. The hydrophobic fine powdery material according to claim 40, wherein the organic silane compound is an alkoxysilane selected from the group consisting of n-butyltrimethoxysilane, isobutyltrimethoxysilane, n-butyltriethoxysilane, isobutyltrimethoxysilane, n-pentyltrimethoxysilane, n-pentyltriethoxysilane, n-hexyltrimethoxysilane, n-hexyltriethyoxysilwne, n-heptyltrimethoxysilane, n-heptyltriethoxysilene, n-octyltrimethoxysilane, n-octyltriethoxysilane, n-nonyltrimethoxysilane, n-nonyltriethoxysilane, n-decyltrimethoxysilane, and n-decyltriethoxysilane.

42. The hydrophobic fine powdery material according to claim 27, wherein the fine powdery material has an average particle diameter ranging from 0.005 to 0.1 μm.

43. The hydrophobic fine powdery material according to claim 9, wherein the fine powdery material has an average particle diameter ranging from 0.01 to 0.05 μm.

* * * * *

UNITED STATES PATENT AND TRADEMARK OFFICE
CERTIFICATE OF CORRECTION

PATENT NO. : 5,635,326
DATED : June 3, 1997
INVENTOR(S) : Makoto Kanbayashi, et. al.

It is certified that error appears in the above-identified patent and that said Letters Patent is hereby corrected as shown below:

COLUMN 1

Line 22, "JP-B-4324748" should read --JP-B-43-24748--.

COLUMN 9

Line 54, "n-hexyltriethyoxysilwne," should read
   --n-hexyltriethoxysilane,--.
Line 55, " n-heptyltriethoxysilene," should read
   --n-heptyltriethoxysilane,--.

COLUMN 11

Line 5, "copolymers." should read --copolymers,--.

COLUMN 25

Line 43, "n-hexyltriethyoxysilwne," should read
   --n-hexyltriethoxysilane,--.
Line 44, "n-heptyltriethoxysilene," should read
   --n-heptyltriethoxysilane,--.
Line 67, "10)." should read --10.--.

UNITED STATES PATENT AND TRADEMARK OFFICE
CERTIFICATE OF CORRECTION

PATENT NO. : 5,635,326
DATED : June 3, 1997
INVENTOR(S) : Makoto Kanbayashi, et. al.

It is certified that error appears in the above-identified patent and that said Letters Patent is hereby corrected as shown below:

<u>COLUMN 28</u>

Line 6, "n-hexyltriethyoxysilwne," should read
--n-hexyltriethoxysilane,--
Line 7, "n-heptyltriethoxysilene," should read
--n-heptyltriethoxysilane,--.

Signed and Sealed this

Twenty-third Day of December, 1997

Attest:

BRUCE LEHMAN

Attesting Officer

Commissioner of Patents and Trademarks